US009528395B2

(12) United States Patent
Elsaesser et al.

(10) Patent No.: US 9,528,395 B2
(45) Date of Patent: Dec. 27, 2016

(54) HEAT RECOVERY SYSTEM FOR AN INTERNAL COMBUSTION ENGINE

(71) Applicant: Mahle International GmbH, Stuttgart (DE)

(72) Inventors: Alfred Elsaesser, Keltern (DE); Christian Maisch, Kirchheim (DE); Rolf Mueller, Steinheim/Murr (DE); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 223 days.

(21) Appl. No.: 14/328,648

(22) Filed: Jul. 10, 2014

(65) Prior Publication Data

US 2015/0013334 A1 Jan. 15, 2015

(30) Foreign Application Priority Data

Jul. 11, 2013 (DE) ........................ 10 2013 213 581

(51) Int. Cl.
*F01K 23/06* (2006.01)
*F02G 5/02* (2006.01)
(Continued)

(52) U.S. Cl.
CPC ............... *F01K 23/065* (2013.01); *F01K 5/02* (2013.01); *F01K 13/006* (2013.01); *F01K 23/10* (2013.01);
(Continued)

(58) Field of Classification Search
CPC ...... F01K 23/065; F01K 13/006; F01K 23/10; F01N 5/02; F01N 2240/02; F02G 5/00
(Continued)

(56) References Cited

U.S. PATENT DOCUMENTS 5,145,336 A 9/1992 Becker et al.
5,327,987 A 7/1994 Abdelmalek
(Continued)

FOREIGN PATENT DOCUMENTS

DE 4007932 A1 9/1991
DE 19617361 C1 8/1997
(Continued)

OTHER PUBLICATIONS

English abstract for DE-102010034231.
(Continued)

*Primary Examiner* — Hoang Nguyen
(74) *Attorney, Agent, or Firm* — Fishman Stewart PLLC

(57) ABSTRACT

A heat recovery system for an internal combustion engine may include a heat exchanger, through which a fluid heat-transfer medium flows, for transferring heat from an exhaust gas system to the heat-transfer medium. A heat engine, through which the heat-transfer medium flows, may be included for converting the heat transferred to the heat-transfer medium into mechanical output work. A cyclically closed line system may be included for connecting the heat exchanger to the heat engine. The system may include a positive displacement pump for conveying the heat-transfer medium through the line system in a predefined flow direction via mechanical drive work. The system may include a drive, which is hermetically sealed off from the heat-transfer medium, for feeding the drive work to the positive displacement pump, and an output, which is hermetically sealed off from the heat-transfer medium, for discharging the output work from the heat engine.

18 Claims, 1 Drawing Sheet

(51) Int. Cl.
*F01N 5/02* (2006.01)
*F01K 13/00* (2006.01)
*F01K 23/10* (2006.01)
*F01K 5/02* (2006.01)

(52) U.S. Cl.
CPC . *F01N 5/02* (2013.01); *F02G 5/02* (2013.01); *F01N 2240/02* (2013.01); *Y02T 10/16* (2013.01); *Y02T 10/166* (2013.01)

(58) Field of Classification Search
USPC ............ 60/614, 616, 618, 651, 670, 671
See application file for complete search history.

(56) References Cited

U.S. PATENT DOCUMENTS

| | | | | |
|---|---|---|---|---|
| 6,739,139 | B1* | 5/2004 | Solomon | F02B 71/00 62/324.6 |
| 8,132,412 | B2* | 3/2012 | Bennett | B64C 39/024 60/650 |
| 2004/0144093 | A1* | 7/2004 | Hanna | F01K 17/02 60/651 |
| 2010/0194111 | A1* | 8/2010 | Van Den Bossche | F01K 3/247 290/2 |
| 2013/0091884 | A1* | 4/2013 | Hunt | F25B 30/02 62/235.1 |
| 2013/0192225 | A1 | 8/2013 | Rewers et al. | |

FOREIGN PATENT DOCUMENTS

| | | |
|---|---|---|
| DE | 10035625 A1 | 2/2002 |
| DE | 102010034231 A1 | 2/2012 |
| DE | 102010042401 A1 | 4/2012 |
| DE | 202011101243 U1 | 8/2012 |
| EP | 2363578 A2 | 9/2011 |
| WO | WO-2012021881 A2 | 2/2012 |

OTHER PUBLICATIONS

English abstract for DE-202011101243.
English Abstract for DE19617361C1.
English Abstract for DE10035625A1.
English Abstract for EP2363578A2.
European Search Report for EP14173496 dated Oct. 20, 2014.

* cited by examiner

HEAT RECOVERY SYSTEM FOR AN INTERNAL COMBUSTION ENGINE

CROSS-REFERENCE TO RELATED APPLICATIONS

This application claims priority to German Patent Application No. 10 2013 213 581.5 filed Jul. 11, 2013, the contents of which are hereby incorporated by reference in their entirety.

TECHNICAL FIELD

The invention relates to a heat recovery system for an internal combustion engine according to the preamble of claim 1. The invention also relates to a corresponding internal combustion engine according to the preamble of claim 15.

BACKGROUND

An internal combustion engine is a combustion engine that converts the chemical energy of a fuel into mechanical work by combustion. Combustion takes place in a combustion chamber by the ignition of a mixture of fuel and ambient air. The expansion of the combustion waste gas that is heated by the combustion is used to move a piston.

In particular, internal combustion engines are known from the prior art that use up to 40% of the energy stored in the fuel to move the piston. The remaining energy generated in the course of combustion is—in the case of a cooled engine in addition to the coolant—mostly discharged from the engine in the form of heat by escaping combustion waste gases. To reduce such heat losses, it has therefore been proposed to add a suitable heat recovery system to a generic internal combustion engine. The professional journal "lastauto omnibus 1-2/2013" explains on pages 30 ff the basic construction of corresponding devices known in specialist fields.

Another technical article printed in "MTZ 10|2012" from page 768 uses a device referred to as a heat exchanger, which—in a cyclic process known to a steam specialist as a Rankine cycle—transfers thermal energy from the combustion chamber of the engine to a heat-transfer medium that flows around said combustion chamber. K. Schmiederer, J. Eitel, S. Edwards, E. Pantow, P. Geskes, R. Lutz, M. Mohr, B. Sich, R. Dreisbach, J. Wolkerstorfer, H. Theiβl, S. Krapf and K. Neunteufl, "Use potential of a commercial vehicle engine with a Rankine system, determined by means of power measurements with steady-state and non-steady-state cycles and constant emissions", 33rd International Vienna Motor Symposium, 2012, studies the reduction in fuel consumption that can be achieved by the proposed approach.

Problematic in this case is the selection of the heat-transfer medium, which should on the one hand have a high boiling point, heat transfer coefficient, heat capacity and thermal conductivity and on the other hand have low viscosity, flammability, toxicity and a low freezing temperature. Heat exchangers known from the prior art therefore use in addition to conventional coolants for example water, ethanol, methanol, ammonia or mixtures based on these liquids as heat-transfer media.

For instance, US 2008/0008605 A1 discloses a high-pressure fuel pump in which the movable part is a metal bellows, which is filled and emptied alternately with hydraulic liquid under high pressure. The amount of fuel in the chamber in which the bellows moves is determined upstream by a solenoid valve, which is controlled by a computer for monitoring the engine. The proposed pump comprises at least two pump units, which are fed by a single inlet common to both units.

FR 2 828 240-A1 also proposes a hydraulic pump for petrol. Each cylinder of the hydraulic pump is connected on one side to a reservoir and on the other side to a check valve, either of which enter into fluid connection under the action of a distribution device controlled by means of a proportional magnet.

DE 103 06 146 A1 describes a low-pressure store for a high-pressure piston pump for pumping fuel, having a liquid-tight, elastic separating structure, which has a first side and a second side, the first side delimiting a part-volume of the low-pressure store, which is hydraulically connected to a low-pressure side of the high-pressure piston pump. The low-pressure store is characterised in that the elastic separating structure delimits the part-volume in a gas-tight manner.

A disadvantage of these conventional heat recovery systems lies in the long-term wear of the movable parts of the heat recovery system, around which flow passes in this manner. In this respect, the liquids mentioned usually have physical characteristic values with regard to density, viscosity, pour point, aniline point, drop point, setting point and neutralising capacity, which make them appear suitable as lubricants only to a limited extent. The chemical compatibility with customary drive components should likewise not be thought unimportant in the case of some of the heat-transfer media used. The tribological loading of the heat recovery system tends to be further increased by the pressure level of the heat-transfer medium necessary to operate the heat exchanger, depending on the configuration.

SUMMARY

The object of the invention is therefore to create a heat recovery system for an internal combustion engine that overcomes the described disadvantage.

This object is achieved by a heat recovery system having the features of claim 1.

Accordingly, the basic concept of the invention is to configure the heat recovery system in such a manner that its components that move against each other are separated from the heat-transfer medium in a fluid-tight manner. The separation of media thus achieved makes it possible for a person skilled in the art to select a heat-transfer medium that is optimal from functional standpoints to fill the heat recovery system largely independently of the design properties of the drive components, without fear of contact between the heat-transfer medium and the engine parts and the possible consequence of a chemical contact reaction.

To this end, the drive of the pump used to convey the heat-transfer medium is hermetically sealed off from the heat-transfer medium and thus prevents any escape of the heat-transfer medium by design measures. In addition, the output of the heat engine used to extract thermal energy is likewise sealed off from the heat-transfer medium. This modification of the elementary interfaces for the input and output of kinetic energy produces a hermetically closed heat recovery system.

In the case of the pump drive, the intended hermetic seal can be produced for instance by means of a separating diaphragm fabricated from metal or plastic. Relevant known metal or polymer compounds have high ductility, so that a corresponding diaphragm can undergo numerous elastic deformation cycles under the periodic loads occurring during pump operation, without its sealing ability being noticeably impaired by the formation of cracks or other types of material failure. The use of a metallic material also opens up a multiplicity of metallurgical processing methods to a person skilled in the art seeking to design a suitable diaphragm.

To influence the physical, electrical or chemical properties of the material, the application of a suitable coating is recommended, for instance by means of vapour deposition or spraying of a further material or by immersing the separating diaphragm in an electrolyte bath.

In a preferred embodiment, the separating diaphragm forms the wall of a bellows. The use of such a bellows to seal off a pump has already been explained in principle in DE 100 35 625 A1, the cited laid-open specification proposing the use thereof in the injection system of an internal combustion engine. The use according to the invention of a bellows pump for heat recovery advantageously transfers the advantage of improved sealing of the pump chamber to the present scenario.

Such a pump drive can for instance be based on a lifting piston that is mounted movably in the bellows, cavities that remain between the lifting piston and the separating diaphragm inside the bellows being filled by a suitable hydraulic liquid. The force exerted by the lifting piston during driving of the positive displacement pump is transmitted in this case via the hydraulic liquid to the bellows, the expansion of which in turn directly displaces the fluid heat-transfer medium flowing around the bellows on the opposite side of the separating diaphragm. The described hydromechanical connection between the drive and the output permits a person skilled in the art in the field of drive technology to optimally adapt the design of the heat recovery system to overriding space requirements. At the same time, the comparatively high pump capacity required by the use of the positive displacement pump for heat recovery can be achieved in this manner.

Sealing of the output corresponding to the described sealing of the drive can meanwhile be realised by means of a fluid-tight wall of the heat engine. The problem of force transmission to the output that arises in this case can be solved in this arrangement with the aid of what is known as a contactless magnetic coupling known to a person skilled in the art from other contexts.

In a preferred embodiment, the heat recovery system also comprises an equalisation tank, in order to manage the sometimes variable mass flow of the heat-transfer medium through the line system. Owing to the production of a fluid connection between the line system and the equalisation tank, the liquid or gas pressure between the two spaces can be substantially equalised by means of such an arrangement, an additional pressure-equalising diaphragm potentially further improving said effect.

If such an equalisation tank is provided with a filling valve, the heat recovery system can be filled with the heat-transfer medium for first use or emptied in a simple manner via this access point without the escape of the heat-transfer medium during operation of the heat recovery system being likely, given suitable configuration of the filling valve. Such a filling valve is also a sensible measurement point for attaching a pressure sensor, which can be used as part of a measurement device, for instance in conjunction with a control unit, for detecting the filling level of the line system.

In order to limit the mass flow into the heat engine to a desired level or block it entirely, bypass valves can be integrated into the line system at suitable positions. Such an arrangement proves advantageous in particular if the heat recovery from the combustion waste gases is to be stopped temporarily but the operating temperature of an evaporator embedded in the system moves above the decomposition temperature of the heat-transfer medium used. In such a case, the continuous circulation of the heat-transfer medium inside the line system in what is known as overrun operation effectively prevents or delays the occurrence of thermal decomposition effects in the heat-transfer medium.

The addition of a control unit to the heat recovery system allows central regulation of quantity and long-term monitoring of the positive displacement pump and of further system components. Further field units connected to the control unit can also include any generators, pressure or temperature sensors, level meters, safety valves or bypass valves of the heat recovery system in the control concept.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
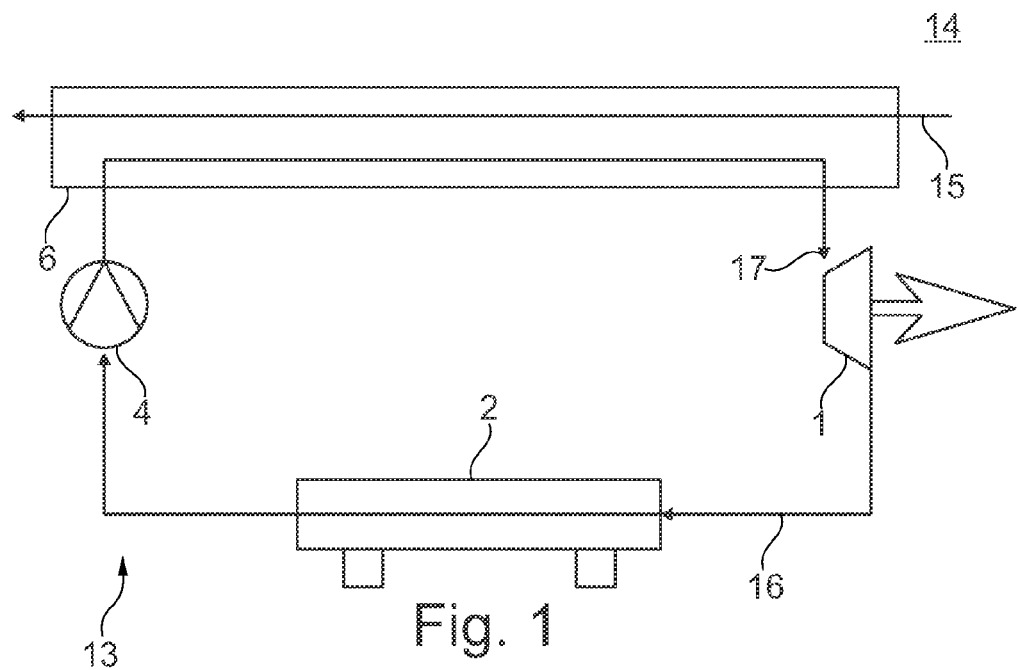
FIG. 1 schematically shows the basic construction of a heat recovery system, and FIG. 2 schematically shows the block diagram of a heat recovery system according to the invention.

FIG. 1 illustrates the basic construction of a heat recovery system 13, as can be used in a generic internal combustion engine 14. Heat recovery means in principle any method for making the thermal energy of a mass flow generated by the combustion process reusable. In the present example scenario, an exhaust system 15 of the internal combustion engine through which heated combustion waste gases flow acts as the heat supplier.

To transfer the thermal energy transported by the exhaust system 15, the recuperative heat exchanger 6 is used, which guides the exhaust gas stream past a heat-transfer medium, separated by a heat-permeable wall. The flow direction 17 of the heat-transfer medium can be directed substantially counter to the exhaust gas stream, so that the separate substance streams form counter currents inside the heat exchanger 6 within the meaning of thermal technology, which allow the temperature of the heat-transfer medium to become equal to that of the exhaust system 15.

To guide the heat-transfer medium inside the heat recovery system 13, a line system 16 is provided, which is closed to form a thermal circuit and in which the heat-transfer medium undergoes a thermodynamic cycle process during operation of the heat recovery system 13. In this process, the fluid heat-transfer medium acting as the working medium completes a periodic sequence of state changes, which in this diagram are initiated by heating by means of the heat exchanger 6. Heated in this manner, the heat-transfer medium flows in the flow direction 17 predefined by the line system 16 through a heat engine 1, which converts the thermal energy transported by the heat-transfer medium into kinetic energy and thus makes it usable as mechanical work. In the present case, the heat engine 1 has the form of an expansion engine, which is driven by the heat-transfer medium that leaves the heat exchanger 6 typically in vapour form. Such a heat engine 1 uses the thermodynamic energy incorporated by the vapour pressure of the heat-transfer medium by transmitting the expansive force exerted by the vaporous heat-transfer medium on expansion thereof to an output.

The heat-transfer medium that exits at a reduced pressure from the heat engine 1 is then fed through the line system 16 in the flow direction 17 to a condenser 2, which recondenses the waste vapour of the heat engine 1. With the return of the heat-transfer medium from its gaseous to the liquid state, the condenser 2 thus closes the described thermodynamic cycle of the heat recovery system 13. To maintain this cycle process, a positive displacement pump 4 is incorporated in the line system 16 at a suitable position, in the present case between the condenser 2 and the heat exchanger 6 fed thereby, which pump circulates the heat-transfer medium in the flow direction 17.

Figure 2:
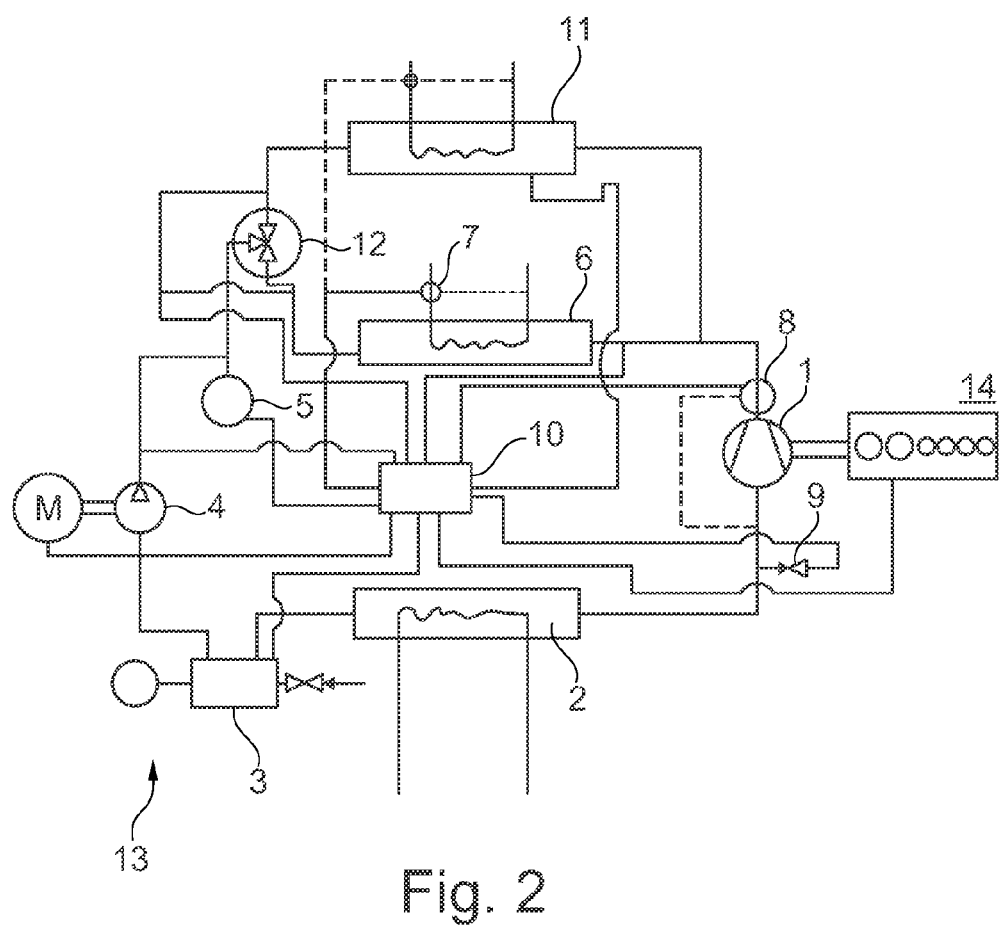

FIG. 2 illustrates the approach according to the invention using a detailed block diagram. As such, the block diagram according to FIG. 2 does not necessarily take into account the real form and arrangement of individual system components of the heat recovery system 13 shown, but rather should be seen as an abstract representation of the functions thereof with the aid of individual symbols for the individual structural elements and the electrical and fluid connections thereof.

The heat engine 1, configured in the form of the above-described expansion engine, of the heat recovery system 13 has a fluid-tight wall, which hermetically seals off its output from the heat-transfer medium. To transfer the output work to be performed at the output through said wall, a magnetic coupling is used, the functional principle of which is based on the generation of a magnetic field between two coupling partners arranged contactlessly on opposite sides of the wall. With regard to the two coupling partners, a wide variety of combinations of permanent magnets or electromagnets are suitable, as long as their mutual force transmission does not require a hole in the wall to guide a drive shaft through. One of the coupling partners can in particular be the rotary field of the stator of an electric motor, generator, hydromotor or a pump. Although these arrangements are not understood as a magnetic coupling in the stricter sense, they operate according to the same principle and expressly included in the term magnetic coupling in the context of the configurations below.

With a now reduced vapour pressure, the waste vapour of the heat engine 1 reaches a condenser 2, which condenses it in the physical sense, that is, transfers it from a gaseous state to the liquid one. In accordance with EN 378 Part 1, a corresponding component of the thermal circuit is also referred to as a liquefier to create a linguistic distinction from an electrical condenser. The functional principle of the condenser 2 does not differ substantially from any conventional heat recovery system and is therefore not described in more detail in the present context.

The condenser 2 is assigned an equalisation tank 3 according to the invention, which seals off the heat-transfer medium from the environment by means of a substance-impermeable wall. A likewise impermeable diaphragm 3, preferably also integrated into said wall, allows where necessary equalisation of the overpressure caused by the variable mass flow of the heat-transfer medium. The heat-transfer medium can be fed to or removed from the equalisation tank, for instance during commissioning or maintenance of the internal combustion engine 14, by means of a specifically provided filling valve.

To convey the heat-transfer medium, a positive displacement pump 4 is used, which is configured as a bellows diaphragm pump and the metallic bellows of which are periodically folded out and together by means of lifting pistons mounted in lubricating oil. With regard to the hydromechanical drive of the lifting piston that acts as the actuating element, the lubricating oil acts as a hydraulic liquid at the same time.

The heat-transfer medium is fed from the positive displacement pump 4 to a spring-loaded store 5, which likewise prevents the heat-transfer medium escaping by means of its fluid-tight walls. The store 5, which is not absolutely necessary for operating a heat recovery system 13 according to the invention, is used to store hydraulic energy, in order to be able to cover phases of increased load owing to more intensive heat recovery and to reduce pressure pulses passing through the line system 16.

The heat-transfer medium conveyed out of the store 5 then feeds a heat exchanger 6 in the form of an evaporator, which transfers the mostly liquid heat-transfer medium in its vaporous state by feeding the thermal energy emitted by the combustion waste gases. To this end, the heat exchanger 6 comprises a surface, through which the heat is transferred from the exhaust system 15 to the heat-transfer medium to be evaporated. An optionally provided further heat exchanger 11 applies the described functional principle analogously to a feedback line of the exhaust system 15 of the internal combustion engine 14.

A waste gas bypass valve 7 arranged upstream of the heat exchanger 6 allows the waste gas to be diverted in view of variable load requirements. The further bypass valve 8 correspondingly arranged upstream of the heat engine 1 analogously allows the heat recovery to be temporarily stopped while maintaining an overrun operation of the heat recovery system 13 that circulates the heat-transfer medium. Finally, a safety valve 9, which is embedded in the line system 16 between the heat engine 1 and the condenser 2 in the flow direction 17 of the heat-transfer medium, allows targeted opening of the heat recovery system 13 to ensure operational safety in case of overloading.

To control and monitor a variety of functions of the heat recovery system 13, the latter comprises a control unit 10, which is shown centrally in FIG. 2. Said control unit is connected to a multiplicity of measurement sensing elements to input corresponding physical measurement variables by means of suitable signal lines. These include a first temperature sensor arranged between the heat exchanger 6 and the heat engine 1 and a second temperature sensor connected to the further heat exchanger 11, as well as pressure sensors assigned to the equalisation tank 3 and to the store 5 and provided upstream and downstream of a control valve 12 used to regulate the mass flow. The control units 10 uses the measurement values detected to actuate the valves 7, 8, 9 and to regulate the output of the pump 4 and of the generator connected to the output.

The invention claimed is:

1. A heat recovery system for an internal combustion engine, comprising:
   a heat exchanger, through which a fluid heat-transfer medium flows, for transferring heat from an exhaust system to the heat-transfer medium, a heat engine, through which the heat-transfer medium flows, for converting the heat transferred to the heat-transfer medium into mechanical output work, a cyclically closed line system for connecting the heat exchanger to the heat engine, a positive displacement pump for conveying the heat-transfer medium through the line system in a predefined flow direction via mechanical drive work, a drive, which is hermetically sealed off from the heat-transfer medium, for feeding the drive work to the positive displacement pump, and an output, which is hermetically sealed off from the heat-transfer medium, for discharging the output work from the heat engine;

wherein the heat engine includes an input operatively connected to the output for transmitting the output work to the output, and wherein the heat engine has a fluid-tight wall separating the input from the output, the wall hermetically sealing off the output from the heat-transfer medium.

2. The heat recovery system according to claim 1, wherein the positive displacement pump has a fluid-tight separating diaphragm, which hermetically seals off the drive from the heat-transfer medium.

3. The heat recovery system according to claim 2, wherein the separating diaphragm includes a metal.

4. The heat recovery system according to claim 2, wherein the separating diaphragm includes a polymer.

5. The heat recovery system according to claim 2, wherein the separating diaphragm includes a layer of coating.

6. The heat recovery system according to claim 2, further comprising a plurality of separating diaphragms, which are connected in a substantially stack-like manner to the separating diaphragm to form a bellows.

7. The heat recovery system according to claim 6, wherein the drive comprises a hydraulic liquid which substantially fills the bellows, and a lifting piston, which is movably mounted in the hydraulic liquid, so that a lifting movement of the lifting piston hydromechanically unfolds the bellows via the hydraulic liquid.

8. The heat recovery system according to claim 1, further comprising a contactless magnetic coupling connecting the input to the output for transferring the output work through the wall without penetrating the wall.

9. The heat recovery system according to claim 1, further comprising an equalisation tank, which is in fluid connection to the line system, for equalising a pressure of the heat-transfer medium.

10. The heat recovery system according to claim 9, wherein the equalisation tank has a filling valve for filling the line system with the heat-transfer medium.

11. The heat recovery system according to claim 10, further comprising a pressure sensor connected to the filling valve for detecting the pressure of the heat-transfer medium.

12. The heat recovery system according to claim 1, further comprising a bypass valve, which is embedded in the line system and is arranged upstream of the heat engine in the flow direction, for diverting the heat-transfer medium around the heat engine.

13. The heat recovery system according to claim 1, further comprising a control unit in communication with the positive displacement pump for controlling the positive displacement pump.

14. An internal combustion engine, comprising:

a combustion chamber for burning a fuel, an exhaust system, which is fluid-connected to the combustion chamber, for discharging a combustion waste gas from the combustion chamber, and a heat recovery system thermally connected to the exhaust system, the heat recovery system including:

a heat exchanger for transferring heat from the exhaust system to a fluid heat-transfer medium;

a heat engine for converting the heat transferred to the heat-transfer medium into mechanical output work, the heat engine including an input, an output and a fluid-tight wall separating the input from the output, wherein the input is operatively connected to the output without penetrating the wall via a contactless magnetic coupling and the output is hermetically sealed from the heat-transfer medium;

a closed line system for connecting the heat exchanger to the heat engine; and a positive displacement pump for conveying the heat-transfer medium through the line system in a predefined flow direction via mechanical drive work, the pump including a drive hermetically sealed from the heat-transfer medium for generating the drive work;

wherein the drive includes a bellows fillable with a hydraulic liquid, and a lifting piston movably mounted in the hydraulic liquid, wherein movement of the lifting piston hydromechanically expands the bellows via the hydraulic liquid.

15. The heat recovery system according to claim 1, wherein the heat engine is an expansion engine.

16. The internal combustion engine according to claim 14, further comprising an equalisation tank fluidly connected to the line system for equalising a pressure of the heat-transfer medium, wherein the equalisation tank has a filling valve for filling the line system with the heat-transfer medium, and a pressure sensor in communication with the filling valve for detecting the pressure of the heat-transfer medium.

17. The internal combustion engine according to claim 14, further comprising at least one of (i) a bypass valve integrated in the line system and arranged upstream of the heat engine in the flow direction, and (ii) a control unit in communication with the positive displacement pump for controlling the positive displacement pump.

18. The internal combustion engine according to claim 14, wherein the bellows is composed of a plastic material.

\* \* \* \* \*